US010229022B1

United States Patent
Gao et al.

(10) Patent No.: US 10,229,022 B1
(45) Date of Patent: Mar. 12, 2019

(54) PROVIDING RAID-10 WITH A CONFIGURABLE RAID WIDTH USING A MAPPED RAID GROUP

(71) Applicant: EMC IP Holding Company LLC, Hopkinton, MA (US)

(72) Inventors: Jian Gao, Beijing (CN); Michael Wahl, Bulverde, TX (US); Jibing Dong, Beijing (CN); Geng Han, Beijing (CN); Wayne Li, Beijing (CN); Jamin Kang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 83 days.

(21) Appl. No.: 15/499,546

(22) Filed: Apr. 27, 2017

(51) Int. Cl.
   *G06F 11/00* (2006.01)
   *G06F 11/20* (2006.01)
   *G06F 3/06* (2006.01)

(52) U.S. Cl.
   CPC ........ *G06F 11/2041* (2013.01); *G06F 3/0619* (2013.01); *G06F 3/0665* (2013.01);
   (Continued)

(58) Field of Classification Search
   CPC ............. G06F 11/2041; G06F 11/2058; G06F 11/2069; G06F 11/202; G06F 11/2023; G06F 11/2056; G06F 11/2094; G06F 3/0619; G06F 3/0665; G06F 3/0689; G06F 3/0614; G06F 3/0628; G06F 3/0629; G06F 3/0631; G06F 3/0638; G06F 3/0644; G06F 3/0662; G06F 3/0683; G06F 2211/1028; G06F 2211/1092
   See application file for complete search history.

(56) References Cited

U.S. PATENT DOCUMENTS 5,579,475 A    11/1996  Blaum et al.
6,405,284 B1 *  6/2002  Bridge ................. G06F 3/0608
                                                       711/114
(Continued)

OTHER PUBLICATIONS

Blaum, et al., "EVENODD: An Optical Scheme for Tolerating Double Disk Failures in RAID Architectures", RAID Architectures: IBM Research Report, RJ 9506, Sep. 1993, pp. 245-254.

(Continued)

*Primary Examiner* — Bryce P Bonzo
*Assistant Examiner* — Anthony J Amoroso
(74) *Attorney, Agent, or Firm* — BainwoodHuang (57) ABSTRACT

A mapped RAID group is generated that contains multiple RAID extents, and each one of the RAID extents is configured and arranged to indicate multiple drive extents that are each a contiguous region of non-volatile data storage in a physical drive. The RAID extents are divided into equal size subsets based on a requested RAID width. Drive extents are allocated from a drive extent pool such that the drive extents indicated by RAID extents contained in the same subset are all allocated from different ones of the physical drives. Logical block rotation is performed between the storage object and the mapped RAID group, causing host data written to consecutive blocks of the storage object address space to be directed to different ones of the RAID extents in the mapped RAID group. Data mirroring is performed between drive extents contained within each of the individual RAID extents of the RAID group.

18 Claims, 6 Drawing Sheets

(52) U.S. Cl.
CPC ........ *G06F 3/0689* (2013.01); *G06F 11/2058* (2013.01); *G06F 11/2069* (2013.01); *G06F 2211/1028* (2013.01); *G06F 2211/1092* (2013.01)

(56) References Cited

U.S. PATENT DOCUMENTS

| | | | |
|---|---|---|---|
| 6,530,035 B1* | 3/2003 | Bridge | G06F 11/1076 714/6.12 |
| 6,567,889 B1 | 5/2003 | DeKoning et al. | |
| 6,718,436 B2* | 4/2004 | Kim | G06F 3/0601 711/114 |
| 6,857,059 B2 | 2/2005 | Karpoff et al. | |
| 7,409,625 B2 | 8/2008 | Corbett et al. | |
| 7,730,259 B2* | 6/2010 | Taguchi | G06F 3/061 711/114 |
| 8,341,349 B2* | 12/2012 | Jess | G06F 3/0611 711/114 |
| 9,069,468 B2* | 6/2015 | Mehra | G06F 3/0605 |
| 9,632,704 B2* | 4/2017 | Gensler, Jr. | G06F 3/0665 |
| 2004/0260967 A1 | 12/2004 | Guha et al. | |
| 2006/0075283 A1 | 4/2006 | Hartung et al. | |
| 2009/0300315 A1* | 12/2009 | Agombar | G06F 3/0608 711/170 |
| 2012/0137065 A1 | 5/2012 | Odenwald et al. | |
| 2012/0173812 A1* | 7/2012 | Kidney | G06F 11/1076 711/114 |
| 2015/0199129 A1* | 7/2015 | Nair | G06F 3/064 711/114 |

OTHER PUBLICATIONS

Miller, Scott A., "Comparing RAID 10 and Raid 01", SMB IT Journal; Jul. 30, 2014; <<http://www.smbitjournal.com/2014/07/comparing-raid-10-and-raid-01/>>article accessed Mar. 21, 2017, 6 pages.

Patterson, et al., "A Case for Redundant Arrays of Inexpensive Disks (RAID)", Proceedings of the 1988 ACM SIGMOD International Conference on Management of Data, ACM, 1988, pp. 109-116.

Perumal, et al., "A Tutorial on RAID Storage Systems", CSO4-05-00. May 6, 2004. Data Network Architectures Group. Department of Computer Science. University of Capetown, 23 pages.

* cited by examiner

PROVIDING RAID-10 WITH A CONFIGURABLE RAID WIDTH USING A MAPPED RAID GROUP

TECHNICAL FIELD

The present disclosure relates generally to intelligent data storage systems, and more specifically to techniques for providing RAID-10 data protection with a configurable RAID width using a mapped RAID group.

BACKGROUND

Data storage systems are arrangements of hardware and software that typically include multiple storage processors coupled to arrays of non-volatile data storage devices, such as magnetic disk drives, electronic flash drives, and/or optical drives. The storage processors service host I/O operations received from host machines. The received I/O operations specify storage objects (e.g. logical disks or "LUNs") that are to be written, read, created, or deleted. The storage processors run software that manages incoming I/O operations and that performs various data processing tasks to organize and secure the host data received from the host machines and stored on the non-volatile data storage devices.

Some existing data storage systems have supported RAID (Redundant Array of Independent Disks) technology. As it is generally known, RAID is a data storage virtualization/protection technology that combines multiple physical drives (a RAID "group") into a single logical unit to provide data redundancy and/or performance improvement. Data may be distributed across drives in one of several ways, referred to as RAID levels, depending on the required levels of redundancy and performance. Some RAID levels employ data striping ("striping") to improve performance. In general, striping involves segmenting logically sequential data, and then storing logically consecutive segments on different drives. By spreading data segments across multiple drives that can be accessed concurrently, total data throughput can be increased. RAID-0 is a RAID level that provides improved performance by striping data across multiple drives.

Data mirroring ("mirroring") is a technique employed by some RAID levels to provide data protection. In data mirroring, data is written identically to at least two drives, thereby producing a "mirrored set" of drives. The data stored on a mirrored set of drives is protected from loss as long as at least one drive in the set is functioning. RAID-1 is a RAID level that provides data protection by way of mirroring.

SUMMARY

Previous data storage systems have exhibited significant shortcomings with regard to providing RAID data protection. For example, some RAID implementations have maintained a dedicated "hot" spare disk for each RAID group that is to be used as a replacement in the event that a disk in the group fails. However, as disk capacity has increased with the introduction of new storage technologies, the time required to rebuild an entire failed disk on a dedicated spare disk has also increased, and the write bandwidth of the spare disk has become a significant performance bottleneck with regard to total rebuild time. Moreover, while the failed disk is being rebuilt to the spare disk, only one of the disks in the mirrored pair that contained the failed disk is fully functioning, and a failure of the remaining functional disk during that time period creates a double disk failure, potentially resulting in data loss. Mapped RAID group technology addresses the problem of increased rebuild times caused by the write bandwidth bottleneck of dedicated spare disks. In a mapped RAID group approach, each physical drive is divided into a number of drive extents that are represented in a drive extent pool, and that are allocated from the drive extent pool to the mapped RAID group. Using mapped RAID group technology, when a physical drive fails, new drive extents can be allocated from the multiple physical drives that contribute to the drive extent pool in order to replace the drive extents from the failed drive, thus spreading write operations performed during the drive rebuild process across multiple physical drives, and avoiding the write bandwidth bottleneck previously caused by rebuilding onto a single dedicated spare drive, thus significantly reducing the time required to rebuild a single failed drive.

In another example of shortcomings of previous data storage systems, some previous systems have not provided support for RAID-10. RAID-10 is a layering of the data striping provided by RAID-0, across mirrored sets provided by RAID-1. RAID-10 calls for RAID-0 striping of data across a series of mirrored pairs of drives, in order to improve performance by increasing concurrent processing during the handling of received I/O operations. The RAID-1 mirroring provided in RAID-10 allows a data storage system to withstand multiple drive failures without data loss, so long as no mirrored set loses both of its mirrored drives.

To address the above described and other shortcomings of previous systems, technologies are disclosed herein for providing RAID-10 data protection for a storage object (e.g. a LUN) using a mapped RAID group in a data storage system having multiple physical drives. As described herein, a mapped RAID group is generated that contains multiple RAID extents. Each one of the RAID extents in the mapped RAID group indicates multiple drive extents that are each a unique contiguous region of non-volatile data storage in the physical drives, and that are used to store data directed to the RAID extent. The set of RAID extents in the mapped RAID group is divided into equal size subsets of RAID extents. For each one of the subsets of the RAID extents in the RAID group, drive extents are allocated from a drive extent pool such that each drive extent indicated by any RAID extent in the subset is allocated from a different one of the physical drives. Logical block rotation is performed between the storage object and the mapped RAID group, causing data written (e.g. by a host) to consecutive blocks of the storage object address space to be directed to different ones of the RAID extents in the mapped RAID group.

In another aspect of the disclosed technology, for each individual RAID extent in the mapped RAID group, data mirroring is performed between the drive extents indicated by the RAID extent, such that the data stored in each drive extent indicated by a given RAID extent is an identical copy of the data stored in every other drive extent indicated by that RAID extent. In this way the set of drive extents indicated by each individual RAID extent forms a mirrored set of drive extents (e.g. a mirrored pair).

In another aspect of the disclosed technology, drive extents may be allocated from the drive extent pool by drive extent pool logic in the storage processor, and the mapped RAID group may be generated by RAID group mapping logic in the storage processor. The drive extent pool logic may receive, from the RAID group mapping logic, a requested RAID width for the mapped RAID group, expressed as a number of drive extents. The number of RAID extents in the equal size subsets of the RAID extents in the RAID group may be determined by the drive extent pool logic such that each subset of the RAID extents indicates a total number of drive extents that is equal to the requested RAID width for the mapped RAID group.

In another aspect of the disclosed technology, the storage object may be accessed by host I/O operations that are passed to storage object mapping logic in the storage processor, and the logical block rotation between the mapped RAID group and the storage object is performed by the storage object mapping logic. A RAID extent size is provided to the storage object mapping logic from the RAID group mapping logic. The RAID extent size indicates an amount of data that may be stored by each RAID extent in the mapped RAID group. A total number of RAID extents contained in the mapped RAID group is also provided to the storage object mapping logic from the RAID group mapping logic. The logical block rotation between the storage object and the mapped RAID group may then be performed by the storage object mapping logic based on the RAID extent size and the total number of RAID extents contained in the mapped RAID group.

In another aspect of the disclosed technology, in some embodiments, performing logical block rotation between the storage object and the mapped RAID group may include dividing the storage object address space into equal size logical blocks, and directing data written to each one of multiple sets of consecutive logical blocks in the storage object address space to a corresponding one of the subsets of RAID extents in the mapped RAID group. In such embodiments, each one of the sets of consecutive logical blocks in the storage object address space has a size equal to a total number of logical blocks that can be stored by the drive extents indicated by a single subset of RAID extents in the mapped RAID group.

In another aspect of the disclosed technology, in some alternative embodiments, performing logical block rotation between the storage object and the mapped RAID group may include dividing the storage object address space into equal size logical blocks, and directing data written to each logical block in each one of multiple sets of consecutive logical blocks in the storage object address space to a different RAID extent in the mapped RAID group. In such alternative embodiments, each one of the sets of consecutive logical blocks in the storage object address space contains a total number of logical blocks that is equal to a total number of the RAID extents in the mapped RAID group.

Embodiments of the disclosed technology may provide significant advantages over previous technical solutions. The disclosed technology effectively provides RAID-10 level service, without requiring a separate striping layer to implement the RAID-0 striping. The disclosed technology provides an efficient solution that distributes storage object data across a series of mirrored sets of drive extents, thus increasing the potential for concurrent processing of I/O operations. The disclosed technology provides mirroring that allows a data storage system to withstand multiple drive failures without data loss, so long as no mirrored set loses both of its drives. By dividing the RAID extents in the mapped RAID group into subsets based on a requested RAID width, the disclosed technology allows for use of a configurable RAID width with regard to the mapped RAID group. Because a mapped RAID approach is used, write operations performed during a drive rebuild can be spread across multiple physical drives, thus avoiding the write bandwidth bottleneck of systems that rebuild a failed drive to a single spare drive, significantly reducing the rebuild time required in the event of a drive failure.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments of the invention will now be described. It should be understood that the embodiments described below are provided only as examples, in order to illustrate various features and principles of the invention, and that the invention is broader than the specific embodiments described below.

Figure 1:
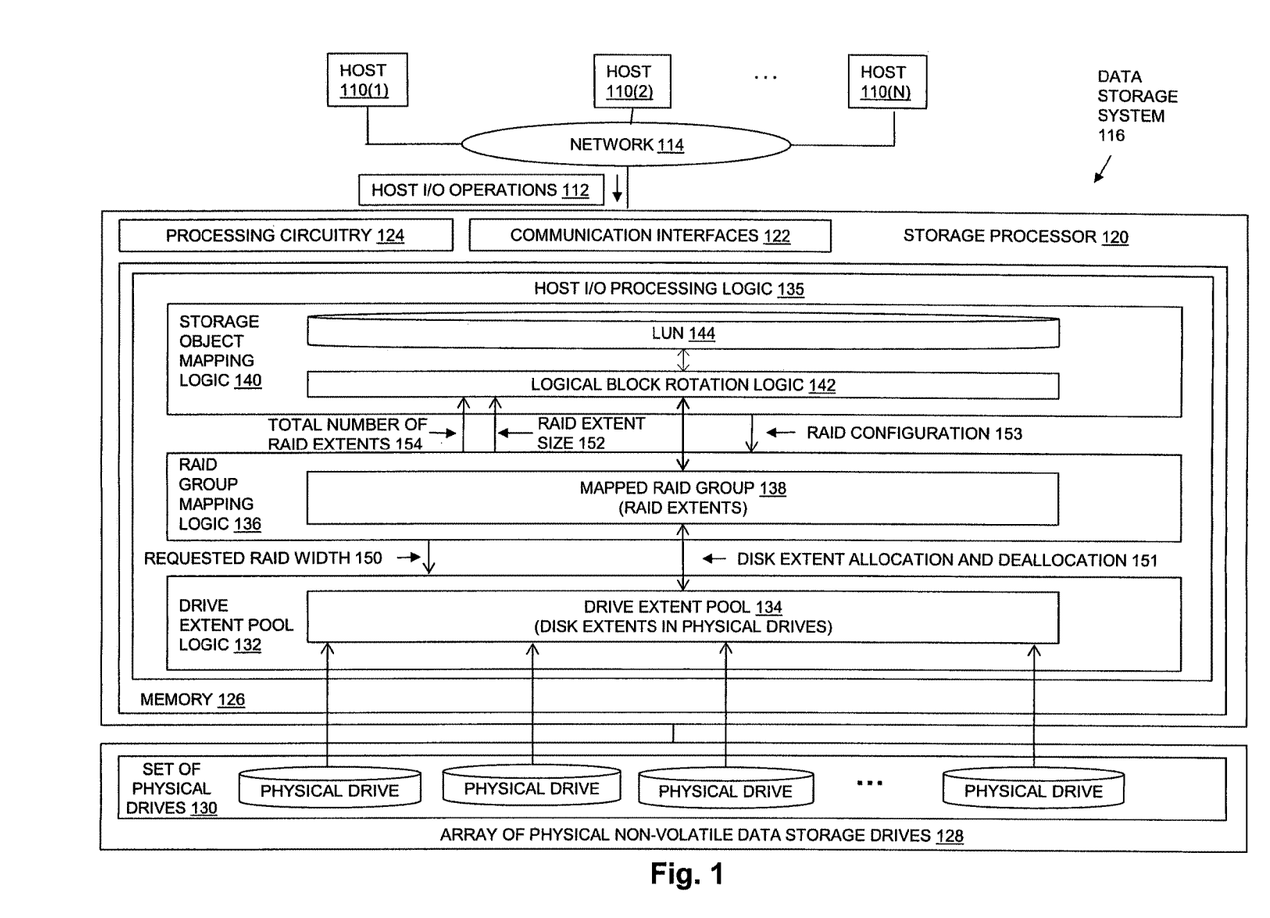
FIG. 1 is a block diagram showing an operational environment for the disclosed techniques, including an example of a data storage system in which the disclosed techniques are embodied.

FIG. 1 is a block diagram showing an operational environment for the disclosed techniques, including an example of a data storage system in which embodiments of the disclosed technologies may be embodied. The data storage environment of FIG. 1 includes some number of Host Computing Devices 110, referred to as "hosts" and shown for purposes of illustration by Hosts 110(1) through 110(N), that access data storage provided by Data Storage System 116, for example over one or more computer networks, such as a local area network (LAN), and/or a wide area network (WAN) such as the Internet, etc., shown in FIG. 1 by Network 114. Data Storage System 116 includes at least one Storage Processor 120 and an Array of Non-Volatile Data Storage Drives 128. Storage Processor 120 may, for example, be provided as a circuit board assembly, or "blade," which plugs into a chassis that encloses and cools multiple storage processors, and that has a backplane for interconnecting storage processors. However, no particular hardware configuration is required, and Storage Processor 120 may be embodied as any specific type of computing device capable of processing host input/output (I/O) operations received from Hosts 110 (e.g. I/O read and I/O write operations, create storage object operations, delete storage object operations, etc.).

The Array of Non-Volatile Data Storage Drives 128 may include magnetic disk drives, solid state drives, hybrid drives, and/or optical drives. Array of Non-Volatile Data Storage Drives 128 may be directly physically connected to and/or contained within Storage Processor 120, and/or may be communicably connected to Storage Processor 120 by way of one or more computer networks, e.g. including or consisting of a Storage Area Network (SAN) or the like.

A Memory 126 in Storage Processor 120 stores program code that is executable on Processing Circuitry 124. Memory 126 may include volatile memory (e.g. RAM), and/or other types of memory. The Processing Circuitry 124 may, for example, include or consist of one or more microprocessors, e.g. central processing units (CPUs), multi-core processors, chips, and/or assemblies, and associated circuitry. Processing Circuitry 124 and Memory 126 together form control circuitry, which is configured and arranged to carry out various methods and functions as described herein. The Memory 126 stores a variety of software components that may be provided in the form of executable program code. For example, as shown in FIG. 1, Memory 126 may include software components such as Host I/O Processing Logic 135. When the program code is executed by Processing Circuitry 124, Processing Circuitry 124 is caused to carry out the operations of the software components. Although certain software components are shown and described for purposes of illustration and explanation, those skilled in the art will recognize that Memory 126 may include various other software components, such as an operating system, various applications, processes, etc.

During operation, Drive Extent Pool Logic 132 generates Drive Extent Pool 134 by dividing each one of the physical drives in the Set of Physical Drives 130 into multiple, equal size drive extents, each of which consists of physically contiguous non-volatile data storage located on a drive. For example, Drive Extent Pool Logic 132 may divide each one of the physical drives into a fixed number of equal size drive extents of physically contiguous non-volatile storage, and add each one of the resulting drive extents to Drive Extent Pool 134. Individual ones of the drive extents in Drive Extent Pool 134 may be i) allocated to the Mapped RAID Group 138, e.g. when Mapped RAID Group 138 is created, or ii) reserved as "spare" drive extents that are kept available for future allocation to Mapped RAID Group 138 in response to a failure condition, e.g. to replace disk extents of a failed drive.

The Set of Physical Drives 130 from which Drive Extent Pool 134 is generated may consist of all the physical non-volatile data storage drives in Array of Physical Non-Volatile Data Storage Drives 128, or only a subset of the physical non-volatile data storage drives in Array of Physical Non-Volatile Data Storage Drives 128. Accordingly, the disclosed techniques may be embodied such that Array of Physical Non-Volatile Data Storage Drives 128 includes multiple separate sets of physical drives, each one of which may be used to independently generate a separate pool of drive extents.

The size of the drive extents into which the physical drives in the Set of Physical Drives 130 are divided is the same for every physical drive in the Set of Physical Drives 130. Various specific sizes of drive extents may be used in different embodiments. For example, in some embodiments each drive extent may have a size of 10 gigabytes. Larger or smaller drive extent sizes may be used in the alternative. Any specific number of physical drives may be contained in the Set of Physical Drives 130 and divided into equal size drive extents to generate Drive Extent Pool 134, so long as the number of physical drives is larger than the Requested RAID Width 150. The physical drives in the Set of Physical Drives 130 may each have the same total capacity, and may accordingly each be divided into the same number of drive extents. Alternatively, the physical drives in Set of Physical Drives 130 may have a variety of different capacities, resulting in different physical drives being divided into different numbers of equal size drive extents.

After dividing each one of the physical drives in the Set of Physical Drives 130 into multiple, equal size drive extents of physically contiguous non-volatile data storage, and adding the drive extents to Drive Extent Pool 134, drive extents may be allocated to specific RAID extents contained in Mapped RAID Group 138, to be used to store data directed to the RAID extents to which they are allocated, as shown at reference number 151 of FIG. 1. For example, a drive extent may be allocated from Drive Extent Pool 134 to a specific RAID extent contained in Mapped RAID Group 138 in response to an allocation request from RAID Group Mapping Logic 136, e.g. when Mapped RAID Group 138 is created, or subsequently to replace a disk extent of a failed disk, and thereafter used to store host data directed to that specific RAID extent. A drive extent may be deallocated from a specific RAID extent back to Drive Extent Pool 134, and thereby made available for allocation to a different RAID extent, in response to a deallocation request from RAID Group Mapping Logic 136, e.g. when the drive extent is no longer needed. Some number of drive extents in Drive Extent Pool 134 are reserved as "spare" drive extents, and kept available for immediate allocation to Mapped RAID Group 138 in order to promptly replace failed drive extents in the event of a drive failure.

Each drive extent may be represented by way of a pair of indexes "m|n", in which "m" indicates a drive index of the physical drive on which the drive extent is located (e.g. a numeric drive number, a slot number within which the physical drive located, or a textual drive name, etc.), and "n" indicates an index of the drive extent within the physical drive (e.g. a numeric drive extent number, a block offset, a sector number, etc.). For example, in embodiments in which physical drives are indexed within Set of Physical Drives 130 starting with 0, and in which drive extents are indexed within the physical drive that contains them starting with 0, a first drive extent of a first drive within Set of Physical Drives 130 may be represented by "0|0", a second drive extent within the first drive within Set of Physical Drives 130 may be represented by "0|1", and so on.

Host I/O Processing Logic 135 exposes one or more logical storage objects to Hosts 110 for reading and/or writing data, so that Hosts 110 can issue Host I/O Operations 112 to specific storage objects, e.g. using names or other identifiers of the storage objects. The storage objects exposed to Host I/O Operations 112 may be written, read, created, and/or deleted by Hosts 110 through Host I/O Operations 112. The storage objects exposed to Hosts 110 may include or consist of logical disks referred to as "LUNs", such as LUN 144. The storage objects exposed to Hosts 110 may alternatively include or consist of a host file system, virtual volume, and/or some other type of storage object, which Host I/O Processing Logic 135 makes accessible to Hosts 110 for reading and/or writing data.

Storage Object Mapping Logic 140 directs host data written to specific blocks of an address space of LUN 144 to specific RAID extents in Mapped RAID Group 138, so that the host data can be persistently stored by the drive extents indicated by those RAID extents. For example, an address space of LUN 144 may be made up of a set of sequentially numbered, equal size logical blocks. In some embodiments, the address space of LUN 144 may be accessed as a sequence of 64 kilobyte (KB) blocks. A host write I/O operation may indicate a specific block to be written within the address space of the LUN 144, e.g. using a logical block number or offset into LUN 144. Storage Object Mapping Logic 140 directs the host data written to a specific block of LUN 144 to a RAID extent in Mapped Raid Group 138, for storage into the drive extents indicated by that RAID extent. Logical Block Rotation Logic 142 performs logical block rotation between the LUN 144 and Mapped RAID Group 138. The logical block rotation performed by Logical Block Rotation Logic 142 causes the host data written to consecutive blocks of the LUN 144 address space to be directed to different RAID extents in the Mapped RAID Group 138.

In some embodiments, each RAID extent in Mapped Raid Group 138 indicates two drive extents that are allocated from Drive Extent Pool 134. The pair of drive extents allocated to and indicated by a given RAID extent are used to store identical copies of host data directed to that RAID extent, and make up a mirrored set of drive extents that are used to store identical copies of data directed to the RAID extent from Storage Object Mapping Logic 140. RAID Group Mapping Logic 136 may perform the data mirroring between the drive extents indicated by each RAID extent. Data mirroring may, for example, be performed in RAID Group Mapping Logic 136 by duplicating the host data directed to each individual RAID extent onto both drive extents indicated by that RAID extent. In this way, any host data written to a block in the address space of LUN 144 and directed to a RAID extent in Mapped RAID Group 136 is written onto both of the drive extents indicated by that RAID extent. Alternatively, data mirroring between drive extents indicated by individual RAID extents may be performed by RAID Group Mapping Logic 136 in whole or in part by background processing or the like that maintains identical data on the two drive extents indicated by each one of the RAID extents in Mapped Raid Group 138. The mirrored pair of drive extents indicated by each RAID extent in Mapped RAID Group 138 is an example of a mirrored set of drive extents. In this way the drive extents allocated to each RAID extent are ultimately used to store host data received from Hosts 110 that is written to LUN 144, and then directed to the RAID extent.

Specific drive extents are selected by Drive Extent Pool Logic 132 for allocation to specific RAID extents based at least in part on the value of a Requested RAID Width 150, which is passed from RAID Group Mapping Logic 136 to Drive Extent Pool Logic 132. Requested RAID Width 150 may be calculated by RAID Group Mapping Logic 136 based on a RAID Configuration 153 that is associated with Mapped RAID Group 138. The RAID configuration 153 for Mapped RAID Group 138 may be received by RAID Group Mapping Logic 136 from Storage Object Mapping Logic 140, and may be a RAID configuration that is a requirement of LUN 144 (e.g. that is a data protection requirement originating from a host or hosts that create and/or use LUN 144 to store data). The RAID configuration for Mapped RAID Group 138 indicates a number of mirrored pairs of drive extents that are to be grouped together into a "striping group" for purposes of data striping. Examples of possible RAID configurations for Mapped RAID Group 138 include i) a "2+2" RAID configuration, indicating that two mirrored pairs of drive extents are to be grouped together in each striping group for purposes of data striping, ii) a "3+3" RAID configuration, indicating that three mirrored pairs of drive extents are to be grouped together in each striping group for purposes of data striping, or iii) a "4+4" RAID configuration, indicating that four mirrored pairs of drive extents are to be grouped together in each striping group for purposes of data striping.

The Requested RAID Width 150 for a given RAID Configuration 153 of Mapped RAID Group 138 is equal to the total number of drive extents in each striping group for the RAID configuration 153. Accordingly, for a "2+2" RAID configuration of Mapped RAID Group 138, each striping group consists of four drive extents, indicated by two adjacent RAID extents within Mapped RAID Group 138, and the value of Requested RAID Width 150 is accordingly four drive extents. For a "3+3" RAID configuration of Mapped RAID Group 138, each striping group consists of six drive extents, indicated by three adjacent RAID extents within Mapped RAID Group 138, and the value of Requested RAID Width 150 is accordingly six drive extents. For a "4+4" RAID configuration of Mapped RAID Group 138, each striping group consists of eight drive extents, indicated by four adjacent RAID extents within Mapped RAID Group 138, and the value of Requested RAID Width 150 is accordingly eight drive extents.

Drive Extent Pool Logic 132 allocates drive extents from Drive Extent Pool 134 based on the Requested RAID Width 150 by first dividing the RAID extents in Mapped RAID Group 138 into equal size subsets of RAID extents. The number of adjacent RAID extents in each subset is based on the Requested RAID Width 150, such that the total number of drive extents indicated by each subset of RAID extents is equal to the Requested RAID Width 150. Accordingly, in the case where Requested RAID Width 150 is equal to four drive extents, and each RAID extent indicates two drive extents, the number of RAID extents in each subset is two. In the case where Requested RAID Width 150 is equal to six drive extents, and each RAID extent indicates two drive extents, the number of RAID extents in each subset is three. And in the case where Requested RAID Width 150 is equal to eight drive extents, and each RAID extent indicates two drive extents, the number of RAID extents in each subset is four.

After dividing the RAID extents in Mapped RAID Group 138 into subsets based on Requested RAID Width 150, Drive Extent Pool Logic 132 allocates drive extents to specific RAID extents in Mapped RAID Group 138 based on the subsets of RAID extents, such that each drive extent indicated by any one of the RAID extents in a particular subset of RAID extents is allocated from a different physical drive in the Set of Physical Drives 130. Accordingly, for example, in the case in which each subset is made up of two RAID extents, and each RAID extent indicates two drive extents, each one of the four drive extents allocated to any individual subset of the RAID extents in Mapped Raid Group 138 is allocated from a different physical drive in the Set of Physical Drives 130. In another example, in the case in which each subset includes three RAID extents, and each RAID extent indicates two drive extents, each one of the six drive extents allocated to any individual subset of RAID extents is allocated from a different physical drive in the Set of Physical Drives 130. And in the case where each subset includes four RAID extents, and each RAID extent indicates two drive extents, each one of the eight drive extents allocated to any individual subset of RAID extents is allocated from a different physical drive in the Set of Physical Drives 130. The number of physical drives in the Set of Physical Drives 130 must be larger than the number of drive extents indicated by Requested RAID Width 150, so that at least one physical drive worth of drive extents in Drive Extent Pool 134 can be reserved as "spare" drive extents that are available for future allocation to Mapped RAID Group 138, to replace drive extents of a failed drive. In response to receipt of a Requested RAID Width 150 that indicates a number of drive extents that is equal to or greater than the number of physical drives in the Set of Physical Drives 130, Drive Extent Pool Logic 132 may reject Requested RAID Width 150, and indicate to RAID Group Mapping Logic 136 that Mapping RAID Group 138 cannot be supported by Drive Extent Pool 134 because the number of physical drives in the Set of Physical Drives 130 is not larger than the number of drive extents indicated by Requested RAID Width 150. RAID Group Mapping Logic 136 may then subsequently establish Mapped RAID Group 138 using a different drive extent pool in Data Storage System 116, that allocates drive extents from a second, different set of physical drives in Array of Physical Non-Volatile Data Storage Drives 128, that includes a larger number of physical drives than is contained in Set of Physical Drives 130.

Figure 2:
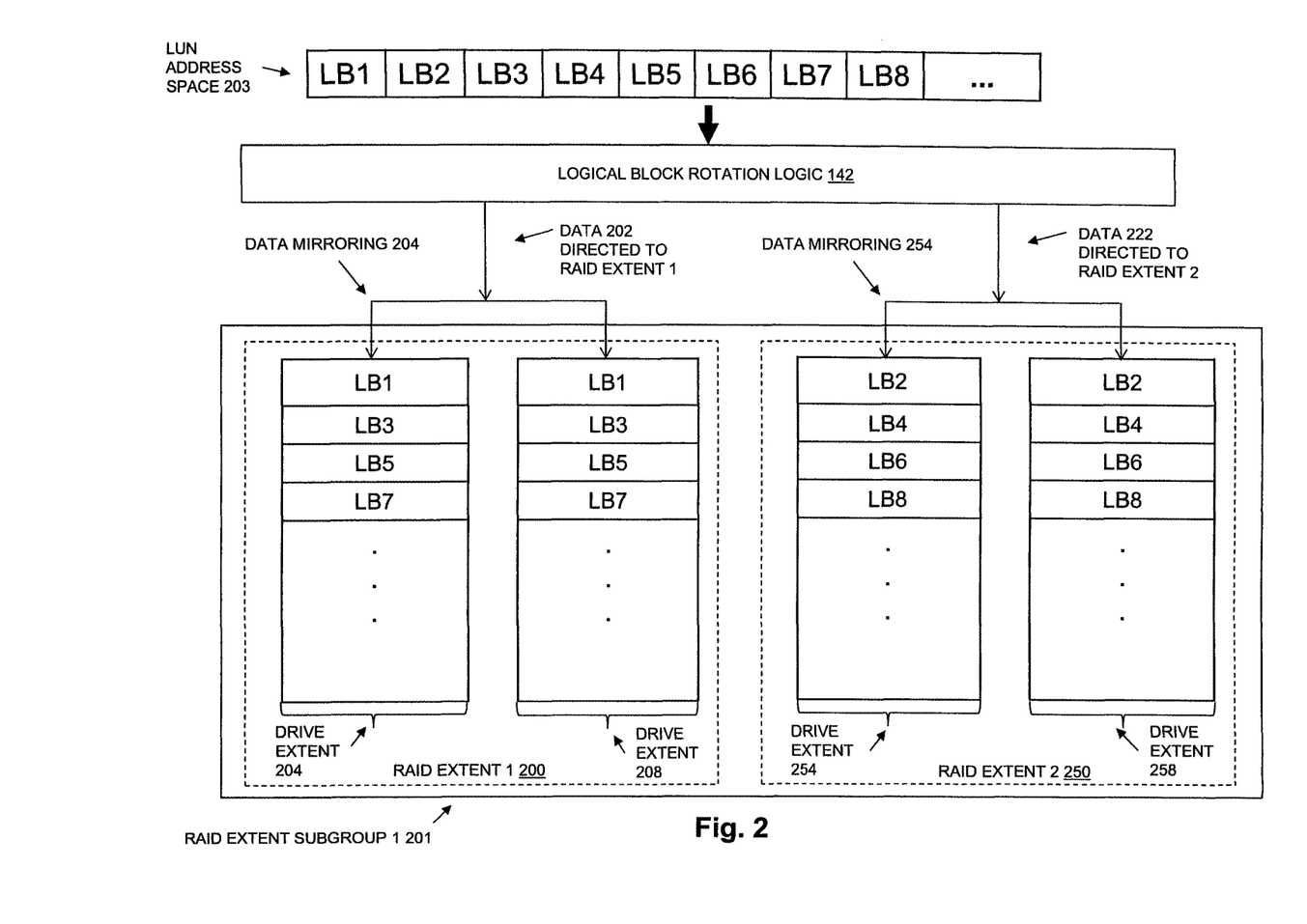
FIG. 2 is a block diagram showing an illustrative example of logical block rotation performed between RAID extents within a RAID extent subgroup, and data mirroring performed between drive extents indicated by individual RAID extents.

FIG. 2 is a block diagram showing an illustrative example of logical block rotation between RAID extents within a RAID extent subgroup, and data mirroring as performed between drive extents indicated by individual RAID extents. As illustrated in FIG. 2, in some embodiments, performing logical block rotation between a storage object and the mapped RAID group may include dividing the storage object address space into equal size logical blocks, and directing data written to each one of multiple sets of consecutive logical blocks in the storage object address space to a corresponding one of the subsets of RAID extents in the mapped RAID group. In such embodiments, each one of the sets of consecutive logical blocks in the storage object address space has a size equal to a total number of logical blocks that can be stored by the drive extents indicated by a single subset of RAID extents in the mapped RAID group.

An example address space of LUN 144 is shown by LUN Address Space 203, and is divided into consecutive logical blocks labeled "LB1", "LB2", "LB3", and so on. Each logical block may, for example, consist of 64 kilobytes of address space. In the example of FIG. 2, logical block rotation is performed by Logical Block Rotation Logic 142 within each subset of RAID extents before moving to the next sequential subset. Accordingly, data written to an initial set of logical blocks in LUN Address Space 203, up to a total number of logical blocks that can be stored by the drive extents indicated by a single RAID extent subgroup, is directed to the RAID extents in an initial RAID extent subgroup, shown by RAID Extent Subgroup 1 201. Data written to a next, equal size set of logical blocks in LUN Address Space 203 is directed to a second RAID extent subgroup (not shown), and so on for the entire LUN Address Space 203, such that data written to each set of logical blocks having a size equal to the total number of logical blocks that can be stored by the drive extents indicated by a single RAID extent subgroup is directed to a corresponding one of the RAID extent subgroups in the mapped RAID group.

For example, data written to consecutive logical blocks of the LUN Address Space 203 is directed to different RAID extents by causing Data 202 directed to RAID Extent 1 200 to include data written to a first logical block "LB1" of LUN Address Space 203, data written to a third logical block "LB3" of LUN Address Space 203, data written to a fifth logical block "LB5" of LUN Address Space 203, data written to a seventh logical block "LB7" of LUN Address Space 203, and so on until Drive Extent 204 and Drive Extent 208 are completely consumed by logical blocks of the LUN Address Space 203. Data 222 directed to RAID Extent 2 250 accordingly includes data written to a second logical block "LB2" of LUN Address Space 203, data written to a fourth logical block "LB4" of LUN Address Space 203, data written to a sixth logical block "LB6" of LUN Address Space 203, data written to an eighth logical block "LB8" of LUN Address Space 203, and so on until Drive Extent 254 and Drive Extent 258 are also completely consumed by logical blocks of the LUN Address Space 203. In other words, data written to the first logical block "LB1" is directed to RAID Extent 1 200, data written to the second logical block "LB2" is directed to RAID Extent 2 250, data written to the third logical block "LB3" is directed to RAID Extent 1 200, data written to the fourth logical block "LB4" is directed to RAID Extent 2 250, and so on for a set of logical blocks in LUN Address Space 203 that is equal in size to the total amount of storage available from RAID Extent Subgroup 1 201, i.e. a set of logical blocks equal in size to the size of two drive extents, since the drive extents in each RAID extent in RAID Extent Subgroup 1 201 are mirror copies. Data written to a next set of consecutive logical blocks in LUN Address Space 203 is directed to a next RAID extent subgroup after RAID Extent Subgroup 1 201, e.g. a second RAID extent subgroup in Mapped RAID Group 138, which is made up of a third RAID extent and a fourth RAID extent, and so on for all the logical blocks in the LUN Address Space 203.

In the example of FIG. 2, RAID Extent Subgroup 1 201 includes two RAID extents, i.e. RAID Extent 1 200 and RAID Extent 2 250. Each RAID extent in the example of FIG. 2 indicates two drive extents: RAID Extent 1 200 indicates Drive Extent 204 and Drive Extent 208, and RAID Extent 2 250 indicates Drive Extent 254 and Drive Extent 258. The RAID Extent Subgroup 201 is an example of a RAID extent subgroup resulting from Drive Extent Pool Logic 132 dividing Mapped RAID Group 138 into subgroups of RAID extents in which subgroup indicates four drive extents, e.g. in response to receipt of a Requested RAID Width 150 equal to four drive extents for a requested RAID configuration of "2+2".

Data Mirroring 204 is performed on Data 202 such that Data 202 is written to both Drive Extent 204 and Drive Extent 208. Data Mirroring 254 is also performed on Data 222 such that Data 222 is written to both Drive Extent 254 and Drive Extent 258. In other words, data written to LB1, LB3, LB5, LB7, and so on for the odd numbered logical blocks within the initial set of logical blocks, is written to both Drive Extent 204 and Drive Extent 208, and data written to LB2, LB4, LB6, LB8, and so on for the even numbered logical blocks within the initial set of logical blocks, is written to both Drive Extent 254 and Drive Extent 258.

Figure 3:
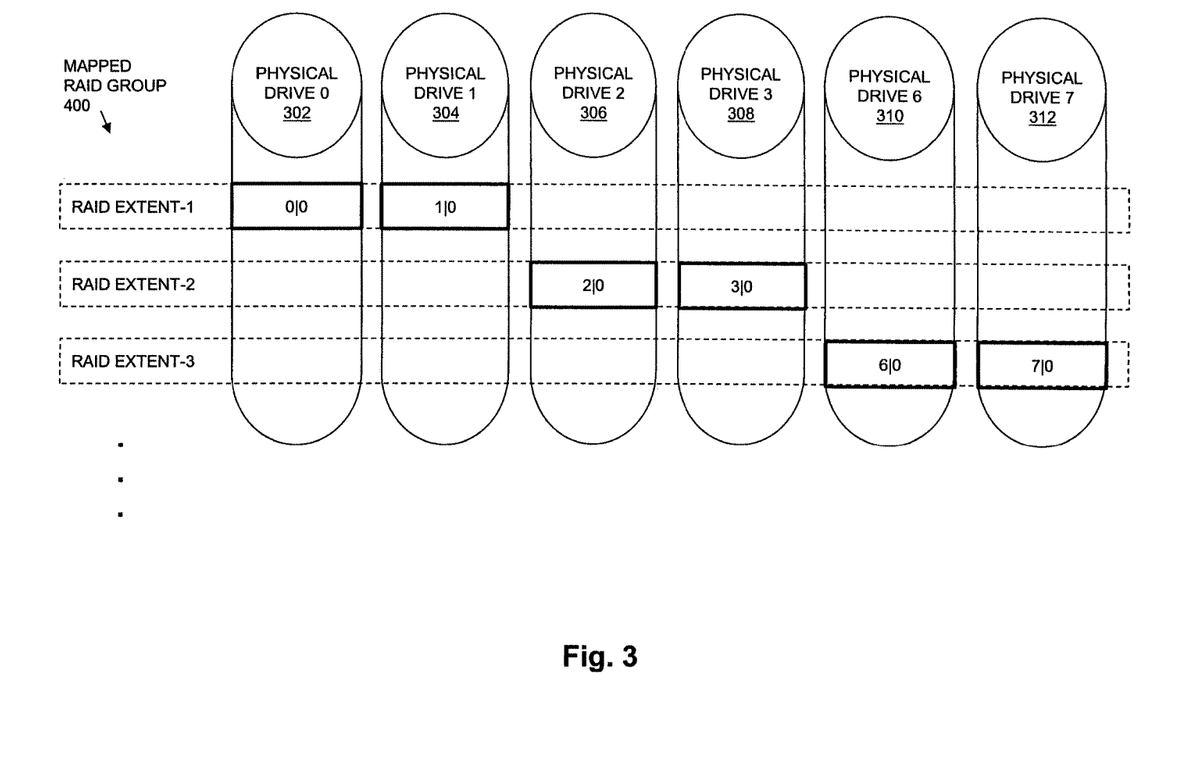
FIG. 3 is a block diagram showing an illustrative example of drive extents indicated by RAID extents.

FIG. 3 is a block diagram showing an illustrative example of drive extents indicated by RAID extents. As shown in the example of FIG. 3, Mapped RAID Group 400 includes some number of RAID extents, shown for purposes of illustration as including a first RAID Extent-1, a second RAID Extent-2, a third RAID Extent-3, and so on. RAID Extent-1 indicates a drive extent 0|0, which is the first drive extent in Physical Drive 0 302, and a drive extent 1|0, which is the first drive extent in Physical Drive 1 304. RAID Extent-2 indicates a drive extent 2|0, which is the first drive extent in Physical Drive 2 306, and a drive extent 3|0, which is the first drive extent in Physical Drive 3 308. RAID Extent-3 indicates a drive extent 6|0, which is the first drive extent in Physical Drive 6 310, and a drive extent 7|0, which is the first drive extent in Physical Drive 7 312. In an embodiment in which Mapped RAID Group 400 is divided into subsets that each contain two RAID extents, RAID Extent-1 and RAID Extent-2 would belong to a first subset of Mapped RAID Group 400, and as a result each one of the four drive extents 0|0, 1|0, 2|0, and 3|0 indicated by RAID Extent-1 and RAID Extent-2 was allocated from a different physical drive, i.e. 0|0 from Physical Drive 0 302, 1|0 from Physical Drive 1 304, 2|0 from Physical Drive 2 306, and 3|0 from Physical Drive 3 308.

Figure 4:
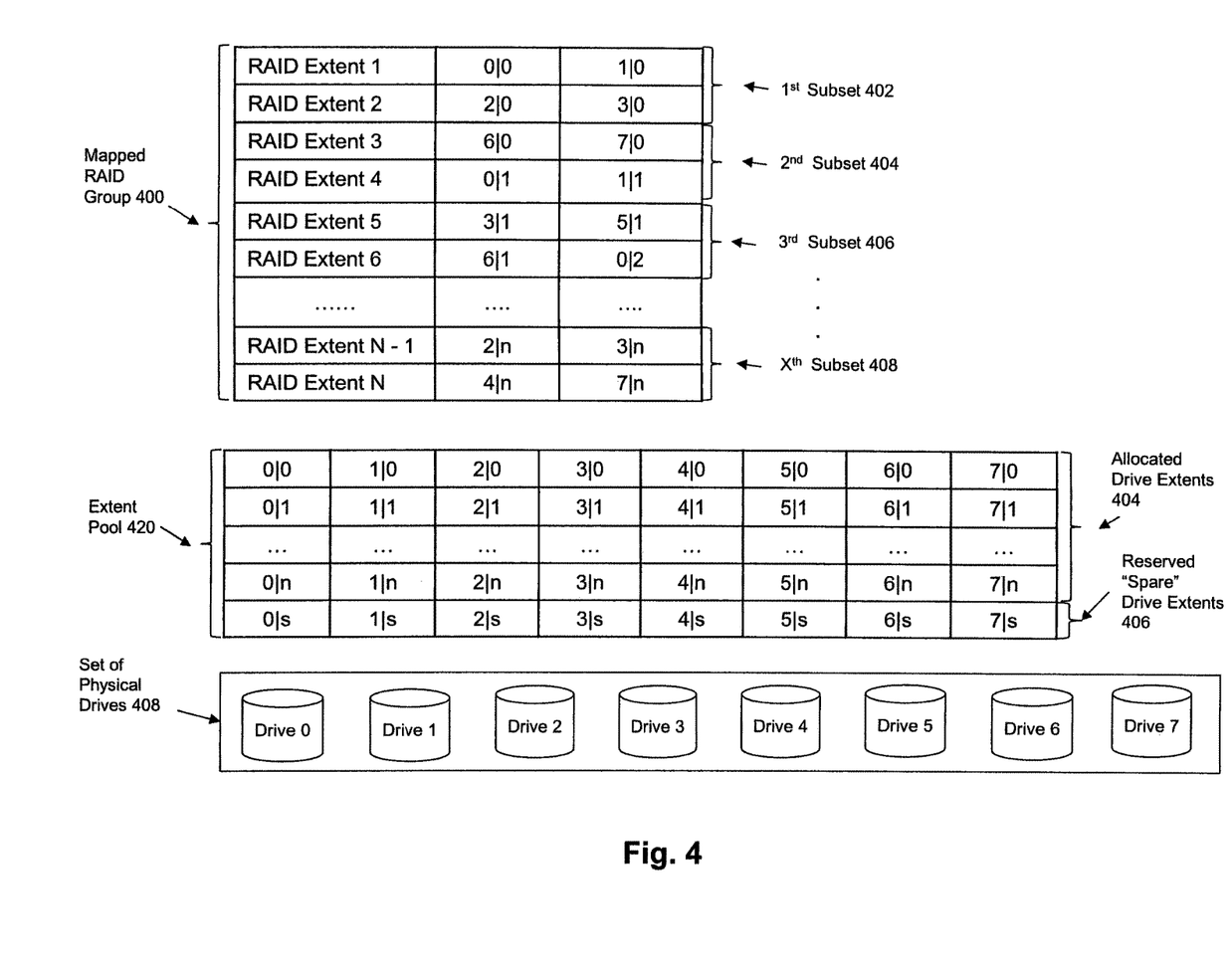
FIG. 4 is a block diagram showing an illustrative example of a mapped RAID group, an extent pool, and a set of physical drives.

FIG. 4 is a block diagram showing an illustrative example of a mapped RAID group, an extent pool, and a set of physical drives. In the example of FIG. 4, Mapped RAID Group 400 is embodied as a mapping table in which each RAID extent is embodied as a row that stores a representation of each drive extent indicated by that RAID extent. Mapped RAID Group 400 includes "N" RAID extents, shown as RAID Extent 1 through RAID Extent N. Each of the RAID extents in Mapped RAID Group 400 indicates two drive extents. Specifically, RAID Extent 1 indicates drive extents 0|0 and 1|0, RAID Extent 2 indicates drive extents 2|0 and 3|0, RAID Extent 3 indicates drive extents 6|0 and 7|0, RAID Extent 4 indicates drive extents 0|1 and 1|1, RAID Extent 5 indicates drive extents 3|1 and 5|1, RAID Extent 6 indicates drive extents 6|1 and 0|2, and so on, through RAID Extent N−1, which indicates drive extents 2|n and 3|n, where "n" is the total number of drive extents in each physical drive, and RAID Extent N, which indicates drive extents 4|n and 7|n.

Further in the example of FIG. 4, Mapped RAID Group 400 has been divided into "X" subsets that are each made up of two RAID extents. The subsets are shown by a 1st Subset 402 made up of RAID Extent 1 and RAID extent 2, 2nd Subset 404 made up of RAID Extent 3 and RAID extent 4, 3rd Subset 406 made up of RAID Extent 5 and RAID extent 6, and so on through an Xth Subset 408 made up of RAID Extent N−1 and RAID Extent N. The drive extents indicated by each one of the "X" subsets of RAID extents are each allocated from different physical drives. Accordingly, the four drive extents indicated by 1st Subset 402 are allocated from physical drives 0, 1, 2 and 3, the four drive extents indicated by 2nd Subset 404 are allocated from physical drives 6, 7, 0 and 1, the four drive extents indicated by 3rd Subset 406 are allocated from physical drives 2, 3, 4 and 7, and so on through the four drives indicated by Xth Subset 408 that are allocated from physical drives 2, 3, 4 and 7.

Also shown in FIG. 4 is Extent Pool 420, in which each one of the physical drives in Set of Physical Drives 408 has been divided into equal size drive extents. In Extent Pool 420, the Allocated Drive Extents 404 have been allocated to RAID extents in Mapped RAID Group 400, and the Reserved "Spare" Drive Extents 406 are reserved as spares to be allocated to Mapped RAID Group 400 to replace drive extents of a failed physical drive in the event of a drive failure. In the example of FIG. 4, Reserved "Spare" Drive Extents 406 includes at least one drive extent from each one of the physical drives in the Set of Physical Drives 408. While the drive extent index for each one of the drive extents in Reserved "Spare" Drive Extents 406 is shown for purposes of illustration by "s", the "s" only indicates that a drive extent at a certain offset of the physical drive is reserved for future allocation, and not a specific index within the physical drive. The drive extents in Reserved "Spare" Drive Extents 406 may accordingly be located at various different drive extent indexes within the physical drives in the Set of Physical Drives 408.

Figure 5:
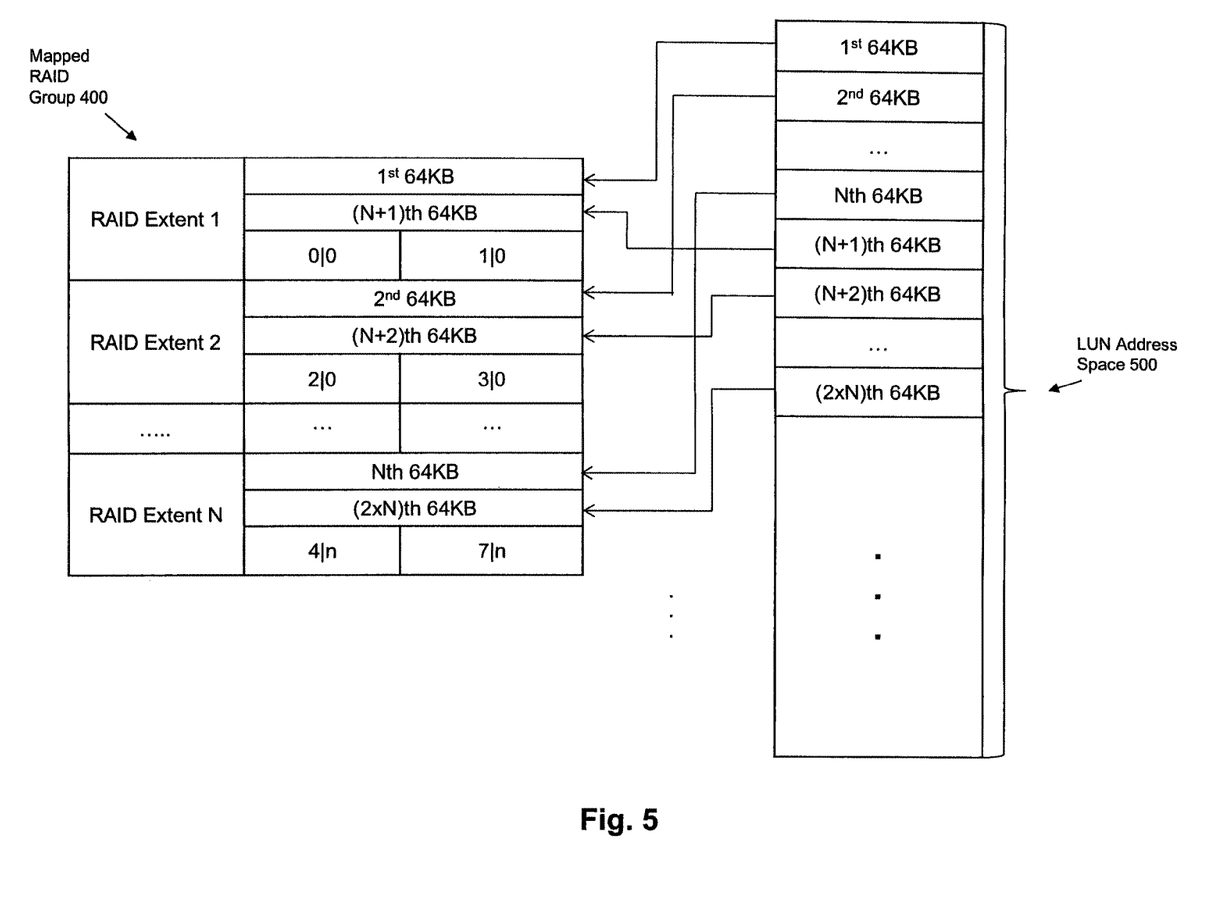
FIG. 5 is a block diagram showing an alternative logical block rotation technique as performed in some alternative embodiments.

FIG. 5 is a block diagram showing an illustrative example of logical block rotation as performed in some alternative embodiments. In such alternative embodiments, performing logical block rotation between the storage object and the mapped RAID group may include dividing the storage object address space into equal size logical blocks, and directing data written to each logical block in each one of multiple sets of consecutive logical blocks in the storage object address space to a different RAID extent in the mapped RAID group. In such alternative embodiments, each one of the sets of consecutive logical blocks in the storage object address space contains a total number of logical blocks that is equal to a total number of the RAID extents in the mapped RAID group.

The logical block rotation of FIG. 5 may be performed by Logical Block Rotation Logic 142 in some embodiments as an alternative to the logical block rotation described above with reference to FIG. 2. In the alternative logical block rotation shown in FIG. 5, the LUN Address Space 500 is divided into equal size logical blocks, and data written to consecutive logical blocks within the LUN Address Space 500 is directed to consecutive RAID extents in Mapped RAID Group 400. Data written to each logical block in a first set of "N" logical blocks of LUN Address Space 500, where N is the number of RAID extents in Mapped RAID Group 400, is directed to a corresponding RAID extent in the Mapped RAID Group 400. Specifically, data written to the first logical block is directed to the first RAID extent, data written to the second logical block is directed to the second RAID extent, and so on through the data written to the Nth logical block, which is directed to the Nth RAID extent. Data written to a next set of N logical blocks of the LUN Address Space 500 is also directed to RAID extents 1 through N, such that data written to logical block N+1 is directed to the first RAID extent, data written to logical block N+2 is directed to the second RAID extent, and so on through the data written to the (2×N)th logical block, which is directed to the Nth RAID extent. Logical block rotation continues in this way across the complete set of N RAID extents for all logical blocks in the LUN Address Space 500.

As illustrated in FIG. 5, using the alternative logical block rotation, in an alternative embodiment in which each equal size logical block of the LUN Address Space 500 consists of 64 KB of address space, and with regard to the first N logical blocks of LUN Address Space 500, data written to the 1st 64 KB of LUN Address Space 500 is directed to RAID Extent 1, to be stored on both drive extents 1|0 and 1|0, data written to the 2nd 64 KB of LUN Address Space 500 is directed to RAID Extent 2, to be stored on both drive extents 2|0 and 3|0, and so on through data written to the Nth 64 KB of LUN Address Space 500, which is directed to RAID Extent N, to be stored on both drive extents 4|n and 7|n. With regard to the second N logical blocks of LUN Address Space 500, data written to the (N+1)th 64 KB of LUN Address Space 500 is directed to RAID Extent 1, to be stored on both drive extents 1|0 and 1|0, data written to the (N+2)th 64 KB of LUN Address Space 500 is directed to RAID Extent 2, to be stored on both drive extents 2|0 and 3|0, and so on through data written to the (2×N)th 64 KB of LUN Address Space 500, which is directed to RAID Extent N, to be stored on both drive extents 4|n and 7|n. This same pattern of logical block rotation, in which data written to each logical block in each set of N logical blocks of the LUN Address Space 500 is directed to a respective one of the N RAID extents in Mapped RAID Group 400, continues for all logical blocks in the LUN Address Space 500.

Figure 6:
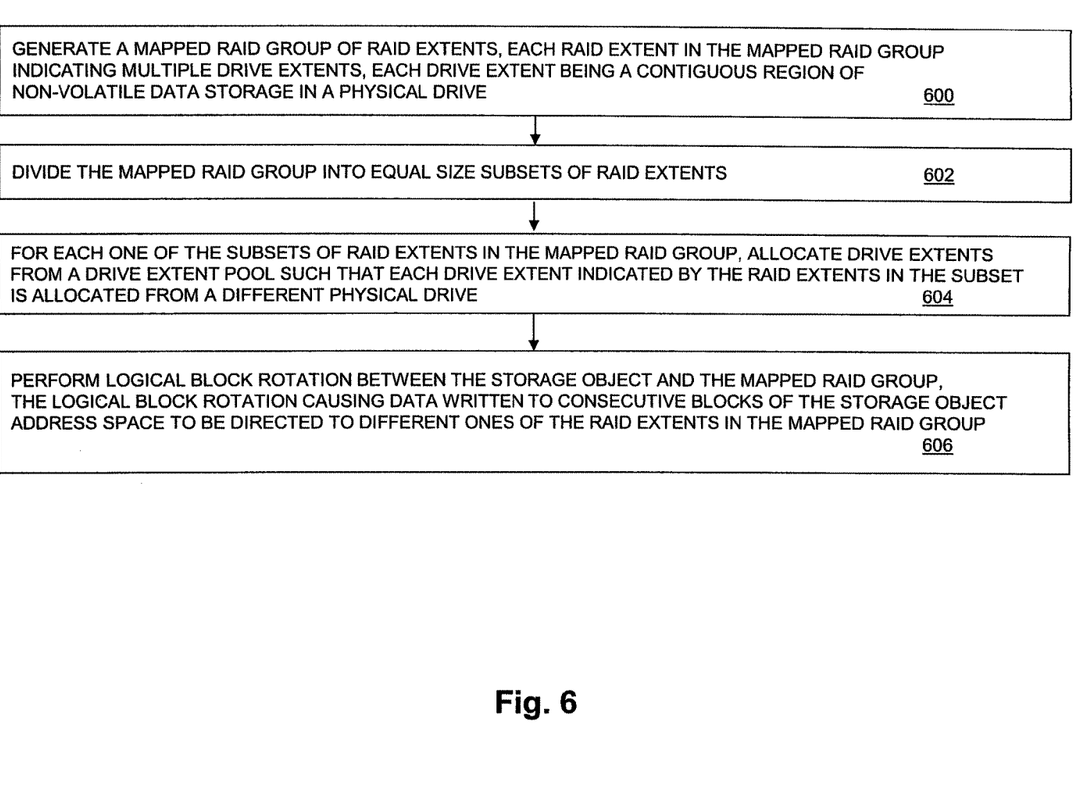
FIG. 6 is a flow chart showing an illustrative example of steps performed during operation of some embodiments.

FIG. 6 is a flow chart showing an illustrative example of steps performed during operation of some embodiments of the disclosed technology. At step 600, a mapped RAID group of RAID extents is generated. Each RAID extent in the mapped raid group indicates multiple drive extents, and each drive extent is a contiguous region of non-volatile data storage in a physical drive. At step 602, the mapped RAID group is divided into equal size subsets of RAID extents. At step 604, for each one of the subsets of RAID extents in the mapped RAID group, drive extents are allocated from a drive extent pool such that each one of the drive extents indicated by the RAID extents in the subset is allocated from a different physical drive. At step 606, logical block rotation is performed between i) a storage object that uses the mapped RAID group to determine drive extents to be used to store data written to the storage object and ii) the mapped RAID group. The logical block rotation performed at step 606 causes data written to consecutive blocks of the storage object address space to be directed to different ones of the RAID extents in the mapped raid group, for storage on the drive extents indicated by the RAID extents to which the data is directed.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method of providing RAID (Redundant Array of Independent Disks) data protection for a storage object in a data storage system, wherein the data storage system includes a storage processor and a set of physical drives communicably coupled to the storage processor, the method comprising:
generating a mapped RAID group, wherein the mapped RAID group contains a plurality of RAID extents, wherein each RAID extent contained in the mapped RAID group is configured and arranged to indicate a plurality of drive extents that are used to store data directed to the RAID extent, and wherein each drive extent comprises a contiguous region of non-volatile data storage in the physical drives;
dividing the mapped RAID group into equal size subsets of the RAID extents in the mapped RAID group;
for each one of the subsets of the RAID extents in the mapped RAID group, allocating drive extents from a drive extent pool such that each drive extent indicated by the RAID extents in the subset is allocated from a different one of the physical drives; and
performing logical block rotation between the storage object and the mapped RAID group, wherein the logical block rotation causes data written to consecutive blocks of the storage object address space to be directed to different ones of the RAID extents in the mapped RAID group.

2. The method of claim 1, further comprising, for each one of the RAID extents contained in the RAID group, performing data mirroring between the plurality of drive extents indicated by the RAID extent such that the data stored in each drive extent indicated by the RAID extent is an identical copy of the data stored in each other drive extent indicated by the RAID extent.

3. The method of claim 2, wherein allocating drive extents from the drive extent pool is performed by drive extent pool logic in the storage processor;
wherein generating the mapped RAID group is performed by RAID group mapping logic in the storage processor; and
wherein the method further comprises:
receiving, by the drive extent pool logic from the RAID group mapping logic, a requested RAID width for the mapped RAID group, wherein the requested RAID width comprises a number of drive extents; and
wherein determining the equal size subsets of the RAID extents contained in the RAID group comprises the drive extent pool logic determining subsets of the RAID extents in the mapped RAID group such that each subset of the RAID extents indicates a total number of drive extents that is equal to the requested RAID width for the mapped RAID group.

4. The method of claim 3, wherein the storage object is accessed by host I/O operations that are passed to storage object mapping logic in the storage processor, wherein the logical block rotation between the mapped RAID group and the storage object is performed by the storage object mapping logic, and wherein the method further comprises:
   providing, to the storage object mapping logic from the RAID group mapping logic, a RAID extent size for the mapped RAID group, wherein the RAID extent size for the mapped RAID group comprises an amount of data that each RAID extent in the mapped RAID group is capable of storing;
   providing, to the storage object mapping logic from the RAID group mapping logic, a total number of RAID extents contained in the mapped RAID group; and
   wherein the logical block rotation between the storage object and the mapped RAID group is performed by the storage object mapping logic responsive to the RAID extent size for the mapped RAID group and the total number of RAID extents contained in the mapped RAID group.

5. The method of claim 4, wherein performing logical block rotation between the storage object and the mapped RAID group comprises:
   dividing the storage object address space into equal size logical blocks; and
   directing data written to each one of a plurality of sets of consecutive logical blocks in the storage object address space to a corresponding one of the subsets of RAID extents in the mapped RAID group, wherein each one of the sets of consecutive logical blocks in the storage object address space has a size equal to a total number of logical blocks that can be stored by drive extents indicated by a single subset of RAID extents in the mapped RAID group.

6. The method of claim 4, wherein performing logical block rotation between the storage object and the mapped RAID group comprises:
   dividing the storage object address space into equal size logical blocks; and
   directing data written to each logical block in each one of a plurality of sets of consecutive logical blocks in the storage object address space to a different RAID extent in the mapped RAID group, wherein each one of the sets of consecutive logical blocks in the storage object address space contains a total number of logical blocks that is equal to a total number of RAID extents in the mapped RAID group.

7. A data storage system that provides RAID (Redundant Array of Independent Disks) data protection for a storage object, comprising:
   at least one storage processor including processing circuitry and a memory;
   a set of physical drives communicably coupled to the storage processor; and
   wherein the storage processor is configured and arranged to:
      generate a mapped RAID group, wherein the mapped RAID group contains a plurality of RAID extents, wherein each RAID extent contained in the mapped RAID group is configured and arranged to indicate a plurality of drive extents that are used to store data directed to the RAID extent, and wherein each drive extent comprises a contiguous region of non-volatile data storage in the physical drives,
      divide the mapped RAID group into equal size subsets of the RAID extents in the mapped RAID group,
      for each one of the subsets of the RAID extents in the mapped RAID group, allocate drive extents from a drive extent pool such that each drive extent indicated by the RAID extents in the subset is allocated from a different one of the physical drives, and
      perform logical block rotation between the storage object and the mapped RAID group, wherein the logical block rotation causes data written to consecutive blocks of the storage object address space to be directed to different ones of the RAID extents in the mapped RAID group.

8. The data storage system of claim 7, wherein the storage processor is further configured and arranged to, for each one of the RAID extents contained in the RAID group, perform data mirroring between the plurality of drive extents indicated by the RAID extent such that the data stored in each drive extent indicated by the RAID extent is an identical copy of the data stored in each other drive extent indicated by the RAID extent.

9. The data storage system of claim 8, wherein the storage processor is further configured and arranged to:
   allocate drive extents from the drive extent pool using drive extent pool logic in the storage processor;
   generate the mapped RAID group using RAID group mapping logic in the storage processor; and
   receive, by the drive extent pool logic from the RAID group mapping logic, a requested RAID width for the mapped RAID group, wherein the requested RAID width comprises a number of drive extents; and
   determine the equal size subsets of the RAID extents contained in the RAID group by the drive extent pool logic determining subsets of the RAID extents in the mapped RAID group such that each subset of the RAID extents indicates a total number of drive extents that is equal to the requested RAID width for the mapped RAID group.

10. The data storage system of claim 9, wherein the storage object is accessed by host I/O operations that are passed to storage object mapping logic in the storage processor, wherein the logical block rotation between the mapped RAID group and the storage object is performed by the storage object mapping logic, and wherein the storage processor is further configured and arranged to:
   provide, to the storage object mapping logic from the RAID group mapping logic, a RAID extent size for the mapped RAID group, wherein the RAID extent size for the mapped RAID group comprises an amount of data that each RAID extent in the mapped RAID group is capable of storing;
   provide, to the storage object mapping logic from the RAID group mapping logic, a total number of RAID extents contained in the mapped RAID group; and
   perform the logical block rotation between the storage object and the mapped RAID group by the storage object mapping logic responsive to the RAID extent size for the mapped RAID group and the total number of RAID extents contained in the mapped RAID group.

11. The data storage system of claim 10, wherein to perform logical block rotation between the storage object and the mapped RAID group, the storage processor is further configured and arranged to:
   divide the storage object address space into equal size logical blocks; and direct data written to each one of a plurality of sets of consecutive logical blocks in the storage object address space to a corresponding one of the subsets of RAID extents in the mapped RAID group, wherein each one of the sets of consecutive logical blocks in the storage object address space has a size equal to a total number of logical blocks that can be stored by drive extents indicated by a single subset of RAID extents in the mapped RAID group.

12. The data storage system of claim 10, wherein to perform logical block rotation between the storage object and the mapped RAID group, the storage processor is further configured and arranged to:
divide the storage object address space into equal size logical blocks; and
direct data written to each logical block in each one of a plurality of sets of consecutive logical blocks in the storage object address space to a different RAID extent in the mapped RAID group, wherein each one of the sets of consecutive logical blocks in the storage object address space contains a total number of logical blocks that is equal to a total number of RAID extents in the mapped RAID group.

13. A computer program product, comprising:
a non-transitory computer readable medium storing program code for providing RAID (Redundant Array of Independent Disks) data protection for a storage object in a data storage system, wherein the data storage system includes a storage processor and a set of non-volatile data storage devices communicably coupled to the storage processor, the set of instructions, when carried out by at least one processor in the storage processor, causing the storage processor to perform a method of:
generating a mapped RAID group, wherein the mapped RAID group contains a plurality of RAID extents, wherein each RAID extent contained in the mapped RAID group is configured and arranged to indicate a plurality of drive extents that are used to store data directed to the RAID extent, and wherein each drive extent comprises a contiguous region of non-volatile data storage in the physical drives;
dividing the mapped RAID group into equal size subsets of the RAID extents in the mapped RAID group;
for each one of the subsets of the RAID extents in the mapped RAID group, allocating drive extents from a drive extent pool such that each drive extent indicated by the RAID extents in the subset is allocated from a different one of the physical drives; and
performing logical block rotation between the storage object and the mapped RAID group, wherein the logical block rotation causes data written to consecutive blocks of the storage object address space to be directed to different ones of the RAID extents in the mapped RAID group.

14. The computer program product of claim 13, wherein the method performed by the storage processor when the set of instructions is carried out by at least one processor in the storage processor, further comprises:
for each one of the RAID extents contained in the RAID group, performing data mirroring between the plurality of drive extents indicated by the RAID extent such that the data stored in each drive extent indicated by the RAID extent is an identical copy of the data stored in each other drive extent indicated by the RAID extent.

15. The computer program product of claim 14, wherein the method performed by the storage processor when the set of instructions is carried out by at least one processor in the storage processor, further comprises:
allocating the drive extents from the drive extent pool using drive extent pool logic in the storage processor;
generating the mapped RAID group using RAID group mapping logic in the storage processor;
receiving, by the drive extent pool logic from the RAID group mapping logic, a requested RAID width for the mapped RAID group, wherein the requested RAID width comprises a number of drive extents; and
wherein determining the equal size subsets of the RAID extents contained in the RAID group comprises the drive extent pool logic determining subsets of the RAID extents in the mapped RAID group such that each subset of the RAID extents indicates a total number of drive extents that is equal to the requested RAID width for the mapped RAID group.

16. The computer program product of claim 15, wherein the storage object is accessed by host I/O operations that are passed to storage object mapping logic in the storage processor, wherein the logical block rotation between the mapped RAID group and the storage object is performed by the storage object mapping logic, and wherein the method performed by the storage processor when the set of instructions is carried out by at least one processor in the storage processor, further comprises:
providing, to the storage object mapping logic from the RAID group mapping logic, a RAID extent size for the mapped RAID group, wherein the RAID extent size for the mapped RAID group comprises an amount of data that each RAID extent in the mapped RAID group is capable of storing;
providing, to the storage object mapping logic from the RAID group mapping logic, a total number of RAID extents contained in the mapped RAID group; and
wherein the logical block rotation between the storage object and the mapped RAID group is performed by the storage object mapping logic responsive to the RAID extent size for the mapped RAID group and the total number of RAID extents contained in the mapped RAID group.

17. The computer program product of claim 16, wherein the method performed by the storage processor when the set of instructions is carried out by at least one processor in the storage processor, further comprises performing logical block rotation between the storage object and the mapped RAID group by:
dividing the storage object address space into equal size logical blocks; and
directing data written to each one of a plurality of sets of consecutive logical blocks in the storage object address space to a corresponding one of the subsets of RAID extents in the mapped RAID group, wherein each one of the sets of consecutive logical blocks in the storage object address space has a size equal to a total number of logical blocks that can be stored by drive extents indicated by a single subset of RAID extents in the mapped RAID group.

18. The computer program product of claim 16, wherein the method performed by the storage processor when the set of instructions is carried out by at least one processor in the storage processor, further comprises performing logical block rotation between the storage object and the mapped RAID group by:
dividing the storage object address space into equal size logical blocks; and directing data written to each logical block in each one of a plurality of sets of consecutive logical blocks in the storage object address space to a different RAID extent in the mapped RAID group, wherein each one of the sets of consecutive logical blocks in the storage object address space contains a total number of logical blocks that is equal to a total number of RAID extents in the mapped RAID group.

\* \* \* \* \*